United States Patent [19]

Edge et al.

[11] 4,091,156

[45] * May 23, 1978

[54] MANUFACTURED GLASS BY CONTIGUOUS FLOAT PROCESS

[75] Inventors: Charles K. Edge, Sarver; Gerald E. Kunkle, New Kensington, both of Pa.

[73] Assignee: PPG Industries, Inc., Pittsburgh, Pa.

[*] Notice: The portion of the term of this patent subsequent to Oct. 22, 1991, has been disclaimed.

[21] Appl. No.: 479,010

[22] Filed: Jun. 13, 1974

Related U.S. Application Data

[62] Division of Ser. No. 338,497, Mar. 6, 1973, Pat. No. 3,843,346.

[51] Int. Cl.² .............................................. B32B 3/02
[52] U.S. Cl. .................................. 428/192; 65/99 A; 65/182 R; 428/81; 428/542
[58] Field of Search ................... 161/1, 149, 192; 65/65 A, 99 A, 182 R; 428/81, 192, 428, 426, 542, 212, 409

[56] References Cited

U.S. PATENT DOCUMENTS

| 3,433,612 | 3/1969 | Dickinson et al. | 65/99 A |
| 3,576,612 | 4/1971 | Prislan | 65/182 R |
| 3,649,237 | 3/1972 | Classen et al. | 65/182 R |
| 3,843,346 | 10/1974 | Edge et al. | 65/182 R |

Primary Examiner—William R. Dixon, Jr.
Attorney, Agent, or Firm—E. Kears Pollock

[57] ABSTRACT

Flat glass having superior optical quality is continuously produced by a contiguous float process in which lamellar flows are established in a molten glass conditioner and the flow patterns are maintained in a stream of glass unidirectionally delivered onto a pool of molten metal on which the glass is cooled and unidirectionally attenuated to form a ribbon of glass.

1 Claim, 9 Drawing Figures

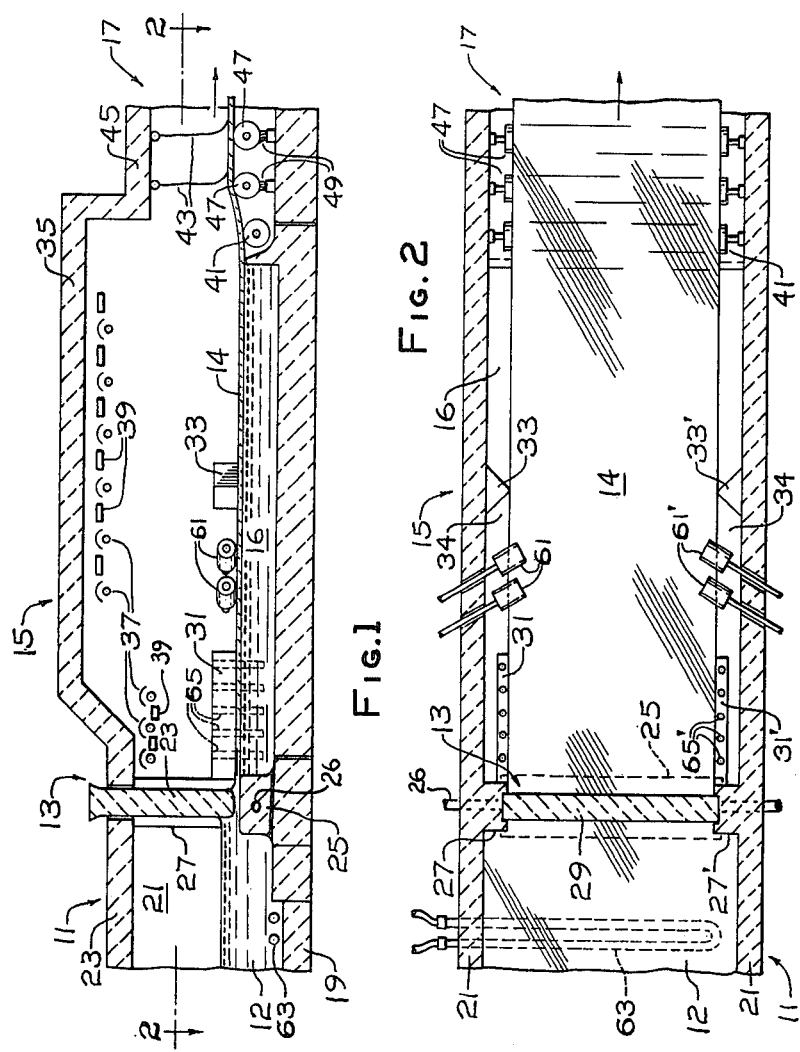

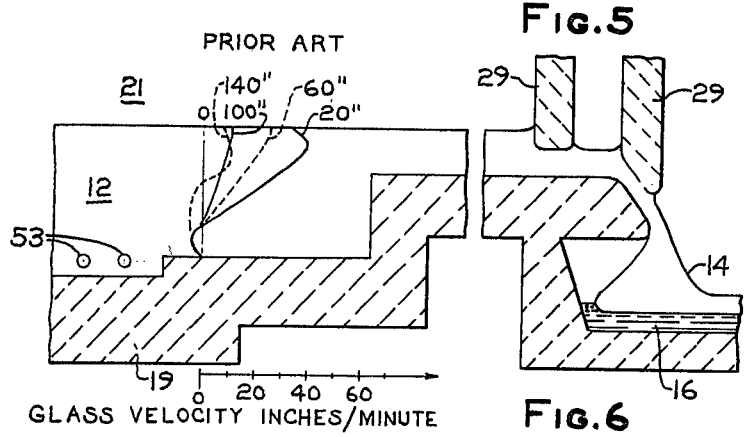
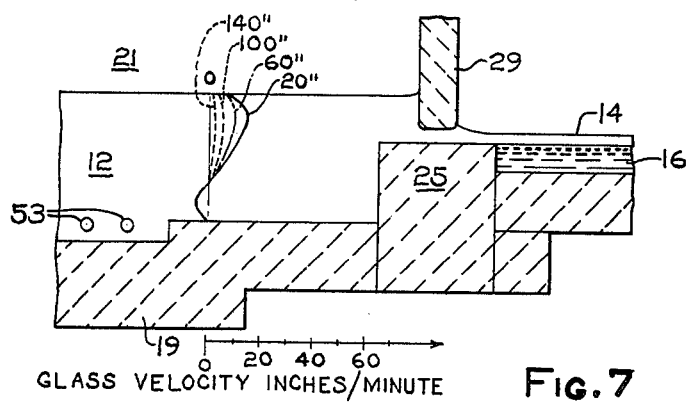
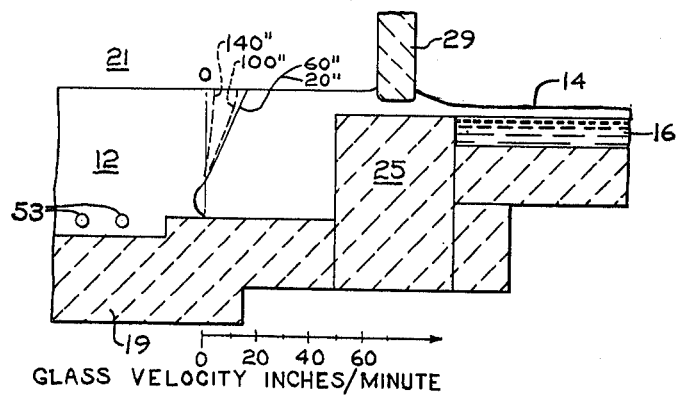

PRIOR ART

MANUFACTURED GLASS BY CONTIGUOUS FLOAT PROCESS

This is a division of application Ser. No. 338,497, filed Mar. 6, 1973 now U.S. Pat. No. 3,843,346.

CROSS REFERENCE TO RELATED APPLICATIONS

This application is related to the following commonly assigned applications all of which were filed on even date herewith and all of which are specifically incorporated by reference herein: "Manufacture of Thin Glass" to Thomas R. Trevorrow and Kenneth R. Graff; "Manufacture of Glass" to William F. Galey; and "Delivery of Molten Glass to a Float Forming Process" to William C. Harrell and Homer R. Foster. The application of Trevorrow and Graff issued as U.S. Pat. No. 3,867,121 on Feb. 18, 1975. The applications of Galey and of Harrell and Foster issued respectively as U.S. Pat. No. 3,843,344 and U.S. Pat. No. 3,843,345 on Oct. 22, 1974.

BACKGROUND OF THE INVENTION

1. Field of the Invention

This invention relates to the manufacture of a continuous sheet of flat glass by floating molten glass on a pool of molten metal while attenuating and cooling the glass. More particularly this invention relates to method and apparatus for manufacturing glass sheets over a wide range of thickness having improved optical quality and being of controlled width.

2. Description of the Prior Art

It has been proposed heretofore to form a continuous sheet of glass by depositing molten glass onto a bath of molten metal, such as molten tin or tin alloy, and drawing the glass along the bath of molten metal while cooling it and attenuating it to form a dimensionally stable ribbon or continuous sheet of glass which is then withdrawn from the bath for further processing. Early developments such as those of Heal, U.S. Pat. No. 710,357 and of Hitchcock, U.S. Pat. No. 789,911, disclose the manufacture of flat glass by continuously feeding molten glass onto a pool of molten metal to form a ribbon of glass which is cooled and drawn along the molten metal bath to form a finished ribbon of glass.

Glass produced according to these methods has been found to exhibit substantial optical distortion as reported by Pilkington in the file histories of the patents described below (Paper No. 5, pages 7 and 8 of U.S. Pat. No. 3,220,816). Optical distortion of a gross nature has thus been attributed in the art to a failure to break up the bottom surface of a discharged stream of glass. A failure to break up the bottom surface has the effect of maintaining imperfections earlier formed in conventionally refined and conditioned glass.

Nearly half a century following the disclosures of Heal and Hitchcock certain developments were made which permitted the commercial development of flat glass manufacture by a float process. These basic developments which have been made in a float process are the subjects of two patents to Pilkington, namely, U.S. Pat. No. 3,083,551 and U.S. Pat. No. 3,220,816. These patents disclose that molten glass, when discharged onto a pool or bath of molten metal, will spread laterally, if unhindered, to an equilibrium width and thickness and that a continuous ribbon of glass can be drawn from the molten glass which has spread out and is floating on the molten metal. These patents further disclose pouring molten glass onto molten metal in a manner such that the glass is allowed to fall freely onto the molten metal. The molten glass then separates into a rearwardly flowing stream and a forwardly flowing stream, both of which flow laterally. According to U.S. Pat. No. 3,220,816, the rearwardly flowing stream is comprised of glass which has been in contact with a refractory discharge member and has been contaminated by such contact, and this portion of glass spreads outwardly into the marginal portions of the finished ribbon and can be conveniently removed from the finished ribbon. These discoveries have permitted the formation of equilibrium thickness glass ribbons which have satisfactory surface quality and satisfactory chemical homogeneity for most present commercial uses.

However, as further developments have occurred, particularly those related to making thicker or thinner than equilibrium glass, workers in the art of glass manufacture have found that the commercially useful processes for making flat glass which depend upon the lateral unhindered flow of glass in its initial forming stages and which depend upon the free fall and rearward flow of at least a portion of the glass contribute to optical distortion in the finished glass which is unsatisfactory for uses which require glass of substantially higher optical quality than was required even a few years ago. For example, in the making of windshields from glass formed by the float process, it has been found desirable to employ glass which is relatively thin, that is, glass which is thinner than equilibrium glass and is of the order of 0.060 inch to 0.15 inch in thickness and preferably about 0.090 inch in thickness. Glass made by the float process to thicknesses on the order of less than about 0.15 inch is found to have greater apparent optical distortion than equilibrium thickness glass and great difficulty is encountered in making such thin glass with adequate optical quality to satisfy the requirements for automotive windshields.

The present invention is directed to a method and apparatus for manufacturing flat glass which has superior optical quality and which has further processing benefits which will be evident from the description which follows.

SUMMARY OF THE INVENTION

Molten glass is supplied from a molten glass source to a conditioner in which lamellar flows are established. Glass which is flowing in smooth lamellar flow is withdrawn from the conditioner through a discharge means which comprises a relatively short pathway for the flow of molten glass to a bath of molten metal. The discharge means is characterized is cross-section as being an opening of generally elongated rectangular shape with a bottom boundary defined by a support member or threshold member, a top boundary defined by a metering barrier, such as a tweel, and with the marginal sides defined by jambs or walls. The spacing between the top member and the bottom member is relatively much less than the spacing between the side walls so that molten glass flowing through the cross-sectional area has a width defined by the distance between the side walls which is many times greater than its thickness as initially defined by the spacing between the top and bottom members.

The molten glass passes from the discharge means onto a pool of molten metal such as tin or a tin-containing alloy. The molten glass may travel only horizontally, as shown in the preferred embodiments, or may descend a slope onto the molten metal. In any event the glass is not allowed to fall freely onto the molten metal for such free fall disrupts the uniform lamellar flows which have been established in the conditioner. This disruption is most evident near the marginal edges of a sheet of glass formed following free fall.

The width of the stream of molten glass may be defined by substantially parallel guide members extending along the path of travel and substantially hindering any outward flow or movement of the molten glass, particularly while the temperature of the molten glass remains high and the viscosity remains sufficiently low to permit substantial lateral flow. These side members may be short. In fact, they may be the sides of the discharge means or they may extend a substantial distance downstream. The side members are preferably comprised of material which is substantially wet by the molten glass within a region along the path of glass travel along their length but which are substantially not wet by the glass at their ends, which are contacted by glass which has cooled to some extent. The side members may be provided with means for heating or cooling them to control the extent to which they are wet by molten glass. Also, a lubricating material may be supplied between the molten glass and the side members. The side members are sufficiently isolated from the external environment to prevent undue cooling of the glass along its marginal portions. An important feature of this invention is that glass flowing in the marginal regions adjacent the side members has a sufficiently high temperature and low viscosity such that excessive drag is not imposed upon the glass as in Heal's and Hitchcock's methods. Therefore, the glass produced by the present method is not plagued with "herringbone" distortion in its marginal portions. The term "herringbone" distortion is a term understood by glassmakers to mean a repeating angular distortion near the margins of a ribbon of glass. It is believed caused by excessive velocity gradients in the glass.

The ribbon of glass moving downstream from the space between the side members is subjected to further cooling and tractive forces along its direction of travel to attenuate the glass to its final thickness while maintaining substantially the same width as that of the glass at its point of exit from confinement between the side members. Variation in width is generally less than plus or minus five percent of the average ribbon width, and the ribbon experiences less than five percent general contraction in width while being conveyed along the bath of molten metal.

The discharge means support may comprise a refractory member such as fused silica which is wet by the glass and extends across the width of the discharge region in opposing relation to the top metering member. The molten glass may simply flow in contact with the refractory support, or a lubricating material, such as molten metal or fused salt, may be supplied between the refractory member and the molten glass. Alternatively, an inert floor may be provided which is constructed of a material, such as an inert metal, particularly platinum, which does not react with the glass. Such a member effectively forms a short threshold over which molten glass may be discharged. The support member may be disposed some distance downwardly from the intended bottom plane of glass flow and be covered with a pool of molten metal of substantial thickness which is in communication with the main bath of molten metal. The floor beneath the molten metal is such an embodiment may be constructed with its edge closest to the source of molten glass slightly raised with respect to the remainder of the floor to prevent molten metal from entering into the source of molten glass, or a weir or threshold block may be provided to separate the molten metal from the source of molten glass. Further refinements of this embodiment are the subjects of the related patent application of William F. Galey and will be specifically referred to below.

The tweel, which impinges against the molten glass, may be constructed of fused silica and may be platinum clad on at least one face (particularly that face facing the source of molten glass), or it may be a molybdenum member. Alternatively, a mechanical barrier may be provided which is closely spaced away from the surface of molten glass, and this barrier may be provided with gas discharge nozzles which are used to provide a gaseous barrier between the source of molten glass and the forming region. Due to the relatively great width of the discharge space compared to the height of the space defining the thickness of the molten glass stream discharged, small variations in height result in substantial variations in cross-sectional area so that the problem of controlling or metering glass which is solved in the prior art by restricting the width of the molten glass stream discharged to substantially less than the unhindered floating width of a ribbon produced requires precise control of the space provided between the upper melting member and the defined bottom surface plane of the molten glass being discharged. Accordingly, the preferred embodiments of this invention generally employ sophisticated metering methods.

One method of controlling the cross-sectional opening which may be employed is the subcombination of elements described for tweel control described in U.S. Pat. No. 3,764,285 to Joseph M. Matesa and Aloysius W. Farabaugh.

The overall effect of the present invention is to deliver a stream of molten glass from a source of molten glass through a conditioner for establishing lamellar flow and then to a discharge means having a width much greater than its height and a longitudinal distance much less than its width. In general, the length of the discharge means will be less than about 20 percent of its width. The stream of molten glass is then discharged, with lamellar flow maintained, onto a bath of molten metal. The flowing molten glass remains in contact with the discharge means, and substantially unidirectional glass flow is maintained along the entire width of flow through the discharge means and onto the pool of molten metal. The stream of molten glass is prevented from flowing laterally outward and is cooled and attenuated along the direction of glass movement to form a dimensionally stable continuous ribbon of flat glass.

In the present process the lateral width of the flowing glass transverse to general glass movement is maintained at a width substantially no greater than the width of the molten glass discharged from the source of the molten glass to the discharge means. This, along with the establishment and maintenance of lamellar flow patterns, results in glass of superior optical quality. The optical quality of the finished glass is substantially better than the optical quality of glass formed by conventional commercial float forming techniques.

In the present method glass which is flowing at the exposed surface of the glass in the source of molten glass prior to exit through the discharge means is maintained substantially at or near the top surface of the ribbon throughout its formation, and glass which enters the discharge means in contact with the discharge means floor substantially forms the bottom surface of the finished glass ribbon which is maintained in contact with the molten metal throughout formation. Glass which enters the discharge means at the sides of the stream of flowing molten glass remains in substantially the same position in relation to the finished ribbon. The total effect of these flow conditions which are established and maintained throughout the process of transferring molten glass from a molten glass source to and through a forming chamber is responsible for the improved optical quality of the finished glass made by the present method.

The present method in its preferred embodiments provides further improvements over existing commercial float glass processes, which improvements are believed to be related to improved cooperation between the refining zone of a source of molten glass and the float forming zone within the process. In conventional float glass making processes the float forming chamber is substantially isolated from the source of molten glass in both a mechanical and a hydrodynamic sense. Glass from throughout the refiner of the molten glass source or furnace is drawn together into a narrow canal, and flow patterns existing in the refiner are disrupted. The relatively narrow stream of molten glass coming from a conventional canal is then allowed to freely fall onto a bath of molten metal and to spread outwardly in all directions. In conventional float glass manufacture, the entrance and exit effects in glass flow caused by narrow canals and the free fall of glass (effectively causing two 90° turns in flow) cause glass to enter onto the molten metal for forming having flows and conditions substantially different from conditions and flows established in the melter and refiner.

In the practice of this invention, lamellar flows are preferably established in the conditioner by providing appropriate thermal conditions to cause a large, and therefore stable, convection cell to develop within the molten glass in the conditioner. The thermal conditions are consistent over a region extending at least about 50 feet upstream into the conditioner from the opening in the front wall of the conditioner leading into the discharge region. Preferably, the region of consistent thermal conditions will extend from 75 to 120 feet upstream, although it may extend even farther without any detrimental effect other than an economic penalty. The consistency required in thermal conditions is one of temperature gradients in the molten glass as may be measured by surface radiation pyrometers. Over the length of the designated region the temperature should drop at an average rate of at least 2F.° per foot and no more than about 15F.° per foot. Preferably, cooling will be sufficiently gradual to establish a temperature drop at an average rate between 4F.° per foot and 7F.° per foot. Too low a rate will prevent the development of full lamellar flow. Too high a rate will cause limited local and sporadic mixing, resulting in compositional, and thus index of refraction, inhomogeneities in the glass.

In the preferred embodiments of this invention, any thermal control which is imposed upon the glass in the refiner is used to advantage by positioning the plane of the bottom of glass flow through the discharge means at a level well above the neutral plane of flow that is established in the refiner or conditioner. The neutral plane of flow in the refiner is the plane beneath the exposed surface of the glass where there is substantially no net forward glass flow. Above the neutral plane there is increasing glass speed in the direction of general glass flow through the process. Immediately below the neutral plane there is glass flow counter to general glass flow which is induced by the natural thermal convection which exists in the conditioner or refiner. In a preferred embodiment, cooling in the refiner is provided primarily by submerged coolers in the glass and by cooling beneath the refractory floor of the refiner.

By essentially skimming the top forwardly flowing portion of glass in the refiner and carrying this glass as a stream through the discharge means and onto the molten metal, the lamellar flows which are established in the molten glass in the refiner are maintained throughout the formation of a continuous ribbon or sheet of glass. Whatever chemical inhomogeneities may exist in the glass do not become evident due to limited sporadic mixing because optical lenses cannot be formed so long as elements of glass having differing indices of refraction are maintained in relatively flat, parallel planes.

A particular unexpected result is obtained in the practice of the present invention which may be attributed to the cooperation between the refiner or conditioner and the discharge or delivery means of the present invention. Not only does the present delivery means provide for maintaining desirable flow conditions within a stream of glass once they have been established, but also the present glass discharge and delivery technique favorably influences flow conditions and thermal conditions within the refiner or conditioner which is upstream to the delivery means. Apparently because the present invention provides for skimming a relatively thin layer of glass from the pool of molten glass in the refiner or conditioner, the velocity through the thickness of the molten pool of glass is altered with its forwardly flowing component made more uniform in depth and in width very close to the exposed glass surface. Thus, the heat transfer from the hot glass in the conditioner to its surroundings is enhanced without imparting undue thermal instabilities to the pool of molten glass. Apparently because molten glass is an excellent heat absorber and radiator, heat loss from a relatively thin body of molten glass is substantially greater than from a relatively thick body of molten glass of equivalent mass. Therefore, in the present method the glass which is continuously being discharged from the pool of molten glass in the refiner or conditioner is relatively wide and thin in comparison to the main stream of flow from a conditioner or refiner in a conventional float glass process and heat removal is accomplished with considerably greater efficiency in the present process. This has been demonstrated by experiment and establishes the present process as one in which greater production rates may be obtained without requiring investment in larger manufacturing facilities. Meanwhile, the process is one which conserves energy.

The establishment and maintenance of lamellar flow in the present process may be easily inferred from the cross-sectional appearance of the finished ribbon of glass. Even when establishing lamellar flows in a conventional float process, which flows are evidenced by substantially layered or paralled patterns in the cross section of finished glass, glass produced by the Pilkington process has a pronounced and characteristic "J-hook" pattern near the marginal portions of the ribbon. This indicates the failure of that process to maintain lamellar flows. Glass produced by the present process has no "J-hook"; rather the pattern within glass produced according to this invention is one of uniformly nested layers which do not impart characteristic distortion lines to the margins of the ribbon. The characteristic features of the prior art glass and the glass of this invention may be appreciated from the scale drawings representing photographs of the glass. Also, the characteristic center feature of float glass is believed to be diminished in glass produced by the process.

The flows of glass in the conditioner and through the discharge means have been discussed in detail above, and the advantages resulting from these flows have been noted. The flow of glass on molten metal between the side members is also important in the making of high-quality glass.

In the past, when glass ribbons have been formed by cooling a thin flow of glass confined along its edges, the resulting glass ribbons have been characterized by severe optical distortion along the edges and extending inwardly about 10 to 15 percent of the ribbon width on each side. For example, when producing a ribbon 120 inches wide, distortion extending inwardly 6 to 24 inches from each edge has been common. Heretofore, it has been accepted that substantial marginal portions of a glass ribbon must be sacrificed as waste so long as the ribbon was formed by cooling glass while restraining it between marginal barriers.

It has now been discovered that by establishing proper thermal patterns within this forming region between side restraining members that optical distortion near the edges of the glass ribbon may be substantially confined to less than about one percent of the ribbon along each edge. Since ribbons of glass inherently have bulb edges which must be removed in later processing, this marginal distortion wastes no glass but rather is confined to the portion of glass which must be removed from the ribbon in any event.

In essence, the preferred thermal patterns in the present process are different from those practiced before in that marginal temperatures are relatively higher and center temperatures are relatively lower in the forming region immediately downstream of the glass discharge. While raising the temperatures near the restraining members tends to increase wetting of the members, which would in itself cause a greater drag on the glass, it has been found that, by the use of appropriate temperature gradients across the width of glass, the viscosity of glass near the members may be decreased sufficiently relative to the viscosity near the center that less drag results. This may be appreciated by the observation that the flow of glass acts like the flow of two immiscible fluids with the main glass flow over most of the width having a relatively flat velocity profile and the flow near the members having a very steep velocity profile. Sand traces may be used to observe the main glass flow, and, from an appreciation of the physical law of continuity and the known zero flow at the wall of each member, the marginal flow may be known. Essentially the marginal flow acts as a lubricant for the main flow although such a phenomenon seems surprising in view of the general character of glass.

The flow of glass between the restraining members may be described by the following mathematical analysis. In this analysis the physical properties and conditions are represented by symbols:

$x$: the distance to any point from the centerline of glass flow toward a side member; $x = 0$ at the centerline $z$: the distance to any point from an arbitrary reference origin in the direction of glass flow $w$: one-half the width of the glass flow defined as the space between the side members; at the wall of a side member $x = w$ $\delta$: the width of the edge flow defining the amount of glass near the wall having a lower viscosity than the glass in the main flow $\mu$: viscosity of the glass $v_z(x)$: velocity of glass flow in the direction of main flow at any point $L$: an arbitrary distance along the direction of glass flow $\Delta P$: pressure drop across distance $L$ superscripts I and II: I refers to main glass flow, II refers to edge glass flow $x^* = x/w$ $\delta^* = \delta/w$ $\rho = \mu II \mu I$ Starting with a differential momentum balance, the following relationships are apparent:

$$v_z^I(x) = \frac{\Delta P}{2L}\left[\frac{w^2}{\mu II} - \frac{(w-\delta)^2}{\mu II} + \frac{(w-\delta)^2}{\mu I} - \frac{x^2}{\mu I}\right]$$

$$v_z^{II}(x) = \frac{\Delta P}{2L}\left[\frac{w^2 - x^2}{\mu II}\right]$$

$$\frac{v_z^I(x)}{v_z^I(o)} = \frac{[2\delta^* - \delta^{*2} + \rho(1 - 2\delta^* + \delta^{*2} - x^{*2})]}{2\delta^* - \delta^{*2} + \rho(1 - \delta^*)^2}$$

$$\frac{v_z^{II}(x)}{v_z^I(o)} = \frac{1 - x^{*2}}{2\delta^* - \delta^{*2} + \rho(1 - \delta^*)^2}$$

When producing a soda-lime-silica glass by this process, high velocity gradient boundary regions may be effectively established which cause the main flow to be essentially flat over 90 percent of the width of flow. For example, consider a composition having: 73% $SiO_2$, 13.5% $Na_2O$, 0.4% $K_2O$, 8.7% $CaO$, 3.8% $MgO$, 0.15% $Al_2O_3$, 0.3% $SO_3$ and 0.15% $Fe_2O_3$. This glass has the following viscosity — temperature relationship:

| Log of Viscosity (Poises) | Temperature (° F) |
|---|---|
| 2 | 2622 |
| 3 | 2169 |
| 4 | 1873 |
| 5 | 1666 |
| 6 | 1511 |
| 7.6 | 1333 |
| 13 | 1017 |

When forming glass having a composition such as described in a process like that of Heal, the temperature of the marginal portions of the glass drops well below the temperature of the glass in the center of the flow. Because of natural heat loss through the side walls, the temperature of the marginal glass is likely from 100° to 200° F. below the temperature of the central glass. As a consequence the viscosity of the glass near the walls is from five to 10 times as great as the viscosity of the glass in the center of flow. A substantial drag results and extensive portions of the marginal glass have a repeating angular distortion known as "herringbone" distortion.

When forming glass of this composition by the Pilkington process, the edges of the glass are at about the same temperature as the glass at the center of the glass flow. In general, only the distortion due to the free fall is noted along with marginal distortion associated with the necking down of the ribbon from its extent of unhindered lateral flow. This "broken line" distortion is distinguishable from that due to drag. However, occasionally excessive marginal cooling results in "herringbone" distortion. This is so because even in the absence of steeply-declining temperatures near the margins an elongated parabolic velocity profile exists across the ribbon. With this condition the process is at best metastable with respect to avoiding "herringbone" distortion.

In the present process the centrally flowing glass is cooled relatively more rapidly than the marginally flowing glass. This is accomplished by operating centrally located overhead coolers, by applying heat to the marginally flowing glass from marginally disposed overhead heaters or from heated side members or by thermally isolating the side members from the side walls of the forming chamber. The marginal portions of glass are maintained at temperatures at least equal to that of the central portion of glass and preferably are maintained 20° to 200° F. higher in temperature. Typically, glass will be discharged isothermally at about 2000° F.; at a location downstream of the discharge and between the side members where the central portion of the glass (about 90 percent of the glass) has reached a temperature of about 1800° F., the marginal portions of the glass are still at about 1900° F.; just before the glass reaches the downstream ends of the side members the central temperature is 1600° F. and that of the marginal portions is about 1630° F. The velocity profiles resulting from this pattern of temperatures are practically flat over 90 percent of the width of glass with the center velocity about 1.1 times the velocity at a point 5 percent of the width from either side member. A full range of possible velocity profiles may be determined from the mathematical relationships above, and actual velocity profiles for a particular thermal pattern may be experimentally confirmed by sand traces of the central portion of the glass.

The velocity profiles of the prior art process may be easily compared with those of this process by the relationships above as well as by experiment (both in full scale glass production and in small scale physical models). Referring now to the relationships above, the velocity at the center is related to that at a point spaced from a side member a distance that is 5 percent of the entire flow width. Typical ranges for this velocity ratio are: 10 to 20 for a process having glass in contact with side walls exposed to the outside environment; four to six for a conventional, commercial float process having an isothermal width profile; one to five; and more likely one to three, for the present process. It is evident then that glass flow in this process is substantially more uniform across the width of flowing glass than is glass flow in previous processes. This results in reduced glass loss due to marginal distortion in the finished ribbon of glass.

Summarizing, the present invention has several advantages over conventional float forming processes. These advantages are of great utility.

The elimination of unhindered lateral spread greatly simplifies the problem of steering a ribbon of moving glass down the center of a forming chamber and onto the withdrawal rolls and into an annealing layer. The elimination of unhindered lateral spread also reduces the problems of uniform heat removal from the glass.

It is possible to employ lower net refiner glass temperatures in the present apparatus for the problems of divitrification in transfer of glass from the refiner to the forming chamber are minimized in the absence of free fall and rearward flow. This is because stagnation is minimized in the practice of the present method. The employment of lower refiner temperatures permits a higher throughput capability for a melting and refining furnace of given size.

The "herringbone" optical distortion apparent along the marginal portions of conventional glass ribbons is substantially reduced by maintaining relatively flat velocity gradients across the width of a flowing glass stream in the present apparatus.

Aside from the advantages accruing from the present invention in the forming of the glass itself, advantages are also found in subsequent processing steps. For example, the present method provides for making of glass of all useful thicknesses in continuous sheets of substantially the same width so that inspecting and cutting equipment may be used for glasses of different thickness without requiring lateral adjustments of such equipment. This invention is useful in making glass of any composition which may be float formed, such as soda-lime-silica, borosilicate glasses and the like.

The present invention will be further understood from the drawings and descriptions of particular preferred embodiments which follow.

BRIEF DESCRIPTION OF THE DRAWINGS

FIG. 1 is a longitudinal sectional view of an apparatus for making glass in accordance with the present invention showing means for discharging molten glass onto a pool of molten metal.

FIG. 2 is a horizontal sectional view taken along line 2,2 of FIG. 1.

FIGS. 5, 6 and 7 illustrate the flow patterns established in the glass conditioner just prior to withdrawing molten glass for forming. FIG. 5 shows the velocity profiles typical in conventional float glass-making, and FIGS. 6 and 7 show velocity profiles typical within the molten glass when practicing the method of this invention.

DESCRIPTION OF THE PREFERRED EMBODIMENTS

Figure 3:
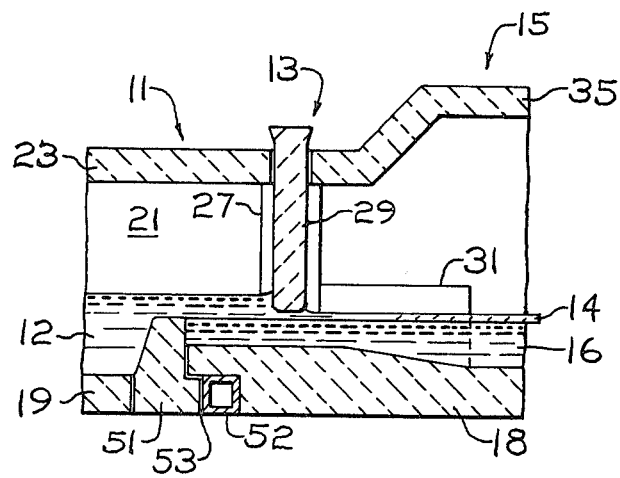
FIG. 3 is a longitudinal section for an alternate apparatus for producing glass according to the present process showing the glass discharge means in detail.

With particular reference to the drawings and especially FIGS. 1 and 2, there is shown an apparatus for producing glass according to the method of this invention. A source of molten glass terminating in a refining and conditioning zone 11 contains molten glass 12. This molten glass conditioner 11 is connected to a discharge means 13 through which molten glass 12 flows in a controlled manner into a forming chamber 15. The forming chamber has within it a pool of molten metal 16 having a density greater than the density of the glass 12 with the upper surface of the molten metal adjusted to a level such that glass 12 may flow without falling freely onto the molten metal 16 and be drawn in unidirectional flow along the surface of the molten metal 16 through the forming chamber 15 to a means 17 for lifting a finished continuous sheet of glass from the forming chamber 15. The molten glass conditioner 11 comprises a refractory floor 19, sidewalls 21 and a roof 23. In the preferred embodiments of this invention the region of the molten glass source connected to the discharge means 13 is a cooled step bottom refiner. The molten glass refiner or conditioner is so constructed and operated that glass passing through it toward the discharge means is gradually cooled. The stepped bottom refiner and bottom cooling tend to stabilize developed lamellar flows. The molten glass 12 is cooled to a temperature at which it is flowable and with some further cooling may be formed into a dimensionally stable sheet of glass. For glasses of typical soda-lime silica composition the temperature of the molten glass in the glass conditioner nearest the discharge means is from about 1700° F. to 2200° F.

The discharge means 13 comprises a threshold block 25 or other apparatus which forms a support beneath the molten glass and separates the molten glass in the conditioner from the molten metal 16 in the forming chamber 15. The top of the threshold block 25 is preferably from 2 to 18 inches below the glass surface in the conditioner. In the embodiment of this invention first described here the support comprises a refractory member 25 which may advantageously be provided with means for heating or cooling 26 in order to control the temperature of the glass flowing in contact with the threshold and thereby control the extent to which the threshold is wet by the flowing molten glass. The discharge means further comprises side jambs 27 and 27' which define the sides of a channel through which molten glass may flow. The discharge means also comprises an adjustable metering means 29 extending downwardly into the molten glass. This metering means 29 is essentially a movable gate or tweel which may be adjusted upward or downward to control the size of the elongated horizontal slot formed by the threshold block 25 and side jambs 27 and 27' and the metering means 29.

Dependent upon the vertical position of the tweel 29 a stream of molten glass flows through the discharge slot from the source of molten glass onto the molten tin 16. The lateral dimension of this stream first defined by the space between side jambs 27 and 27'. This dimension may be maintained by providing guides or restraining members 31 and 31'. The restraining members 31 and 31' are substantially parallel guides comprised of material, such as graphite or alumina, which is wet to a limited extent by molten glass. The restraining members 31 and 31' may be provided with means for temperature control, such as means for heating or cooling the restraining members. In a preferred embodiment, a longitudinal temperature gradient is established along the restraining member length so that there is relatively more wetting of the restraining members by glass near the glass discharge means than there is wetting of the restraining members by glass at the downstream extremity of the restraining members just before the glass is no longer restrained by the restraining members. The length of the restraining members is such that the molten glass may be sufficiently cooled while between the two restraining members that substantially no outward lateral flow occurs within the glass after it is no longer restricted. Alternatively, a fused salt may be floated on the molten metal downstream from the restraining members such that it impinges upon the glass and restricts lateral flow as described in U.S. Pat. No. 3,356,479 to William F. Galey.

In one embodiment of this invention, which is particularly useful for the making of glass which is thicker than conventional equilibrium glass, side dams 33 and 33' are provided downstream in the forming chamber where the glass is sufficiently cooled that marking or disturbing of the glass is unlikely and a fused salt layer 34 is confined within the space defined by the sidewalls of the forming chamber 15, downstream dams 33 and 33' and the restraining members 31 and 31' with the glass sheet 14 which is being formed.

The forming chamber 15 is enclosed by an overhead roof 35. Mounted along the roof 35 of the forming chamber 15 and facing the top surface of the floating continuous ribbon of glass 14 are a series of heaters 37 and a series of coolers 39. These provide for the controlled heating or cooling of the moving ribbon of glass 14 so that the glass may be attenuated and cooled to a dimensionally stable ribbon of desired width and thickness for removal from the forming chamber. Also, connected to the chamber 15 is a source of inert gas and, preferably, also a source of reducing gas to prevent the oxidation of molten metal in the chamber. These sources are not shown but are similar to those known in the art and disclosed in U.S. Pat. No. 3,337,322. Generally, the gas sources are used to direct nitrogen and hydrogen into the chamber.

At the downstream end of the forming chamber 15 there is mounted a take-out roll 41 disposed tranversely across the path of glass movement. This roll 41 supports the ribbon of glass 14 to lift it up from the molten metal bath 16. A series of barriers 43 engage the upper surface of the ribbon of glass 14 to isolate the atmosphere in the forming chamber 15 above the surface of the glass from the downstream processing equipment. The barriers 43 preferably comprise flexible asbestos sheeting mounted and depending from a roof member 45 extending from the roof 35 of the bath chamber 15.

The take-out means 17 comprises, in addition to takeout roll 41 and barriers 43, a series of rolls 47 which support the glass and apply a longitudinal tractive force to the glass drawing it from the forming chamber and carrying it to further processing apparatus, such as an annealing lehr. Mounted in contact with the rollers 47 are brushes 49 which further serve to isolate the forming bath from later processing apparatus.

In practicing the method of this invention, sufficient tractive force is applied to the glass from rollers 47 as well as downstream rollers to unidirectionally attenuate the glass to its desired final thickness, particularly when its desired final thickness is less than equilibrium thickness. It has been found that by appropriate control of the temperature and temperature gradient along the restraining members 31 and 31' and appropriate application of tractive force of the glass by rollers 47 that glass may be produced less than equilibrium thickness without the further asistance of lateral holding members and without lateral stretching as in the prior art, such as U.S. Pat. Nos. 3,222,154, 3,493,359 and 3,695,859. This feature of the present invention results in thin glass having substantially less optical distortion, particularly near its margins, than is apparent in glass produced by conventional commercial float-forming processes. This is the subject of the copending application of Thomas R. Trevorrow and Kenneth R. Graff.

Positive lateral restraint may, however, be used to attenuate a glass ribbon while maintaining substantially constant ribbon width. To accomplish this, edge rolls 61 are employed in combination with the principal apparatus used to practice this invention.

The preferred embodiment of this invention may also have means for cooling the glass in the bottom of the conditioner which supplement the cooling effect provided by a stepped bottom. A cooling pipe 63 may be submerged in the glass, and a coolant, such as water, continuously pumped through this submerged cooler. Such an arrangement is shown in copending application U.S. Ser. No. 300,952. It further stabilizes thermal conditions and insures lamellar flow.

While the heaters 37 and coolers 39, located above the glass immediately downstream of the discharge means 13, are preferably positioned to permit preferential cooling of the central portion of glass, it is also possible to provide for the preferential heating of the marginal portions of glass flowing between the guides 31 and 31'. To accomplish this, the guides are provided with heating means 65.

A second preferred embodiment of the present invention is shown in FIG. 3. In FIG. 3 a transfer means 13 is provided wherein molten metal 16 extends beneath the molten glass passing through the discharge opening through the horizontal slot-like channel formed by side jambs 27 and 27', a metering member 29 and the molten metal. The molten metal is maintained within its pool by sidewalls 21 of the source of molten glass and by a threshold block 51 disposed transversely across the width of the source of molten glass. Preferably, the threshold block is comprised of unreactive material such as fused silica or it may be a platinum-clad refractory block or molybdenum, graphite, boron-nitride or the like. In a preferred embodiment, the threshold block is separated from the bottom of the forming chamber 18 by powdered packing such as powdered graphite 53, and a water box 52 is provided for cooling the threshold block and providing temperature control in the discharge region.

The amount of glass passing through the discharge means is controlled by the space between the bottom of the metering member 29 and the glass molten metal interface in opposing relation to the metering member. A downward thrust of the tweel and the differing hydrostatic pressure behind the tweel in the glass source region as compared with the hydrostatic glass pressure in the forming region downstream of the tweel causes a variation in the depth of molten metal glass surface with respect to the horizontal plane of the support. In general, without auxiliary equipment, the glass molten metal interface will be lower beneath the tweel 29 than it is within the molten glass conditioner region or within the forming chamber.

One particular advantage of the embodiment of this invention shown in FIG. 3 is that the bottom surface glass refractory contact is not only extremely small but occurs a sufficient distance upstream in the process that the glass viscosity is substantially lower than during forming, and any marking or contamination which may occur is effectively eliminated during the forming process.

Figure 4:
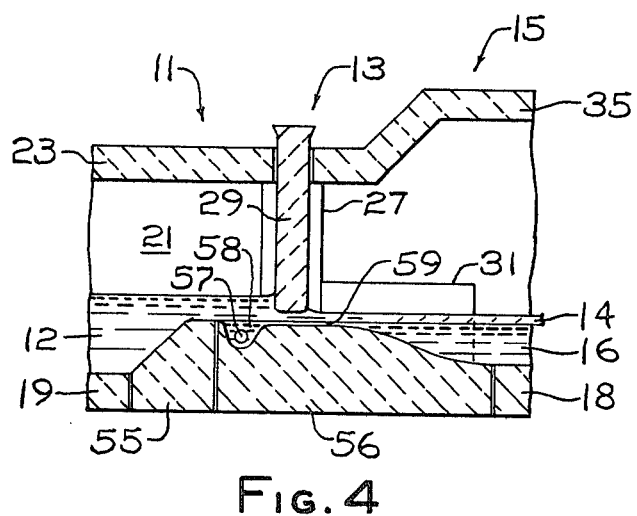
FIG. 4 is also an enlarged longitudinal sectional view of alternate apparatus producing glass according to another embodiment of this invention. The embodiments shown in FIGS. 3 and 4 embrace further inventive concepts which are disclosed and claimed in the related application of Galey.

Another preferred embodiment of the present invention is illustrated in FIG. 4. In FIG. 4, a thin lubricating film of molten metal is provided between the supporting refractory member defining the bottom of the glass discharge channel. In this embodiment, the molten glass 12 flows from the molten glass source 11 over a threshold block 55 and over a relatively shallow pool of molten metal 58 which is in communication with the main pool of molten metal 16 in the forming chamber 15 by means of a thin film 59 spreading over a spout block 56 which forms the bottom of the discharge means 13. The flow channel of the discharge means 13 is defined by the side jambs 27 and 27' by a movable tweel 29 which defines an upper boundary and by the floor or bottom spout block 56. Molten metal supply means 57 are provided in combination with the bottom spout block to continuously supply molten metal in the shallow pool of molten metal 58. The stream of glass flowing through the discharge means exerts a drag upon the molten metal in the reservoir 58 forming a lubricating film 59 of molten metal and carrying the molten metal through to the main body of molten metal 16 in the forming chamber. A particular advantage of this embodiment is that the formation of a thin lubricating film of molten metal provides a sufficiently long discharge path of precise cross-sectional dimensions to form a finished sheet of glass of finely controlled thickness without resort to elaborate attenuation an thermal control throughout the forming chamber.

The cooperation between the refiner or conditioner and the discharge or delivery means of this invention may be further appreciated with reference to the Examples which follow. The thermal conditions and flow conditions throughout the process are shown in FIGS. 5, 6 and 7, which are representative of the data obtained in the following Examples.

EXAMPLE I

Three separate glass conditioning and forming units are operated to compare the flows and temperatures in each. The conditioners each have stepped bottom construction as indicated in FIGS. 5, 6 and 7. The effective width of each conditioner is 360 inches. One conditioner, as shown in FIG. 5, is connected to a conventional float forming bath through a canal having a width of 40 inches and a canal depth 12 inches below the glass line or exposed glass surface within the conditioner. The second conditioner, as shown in FIG. 6, is connected to a bath as in this invention by a threshold delivery means having an opening 180 inches wide and a depth 12 inches below the glass line. The third conditioner, as shown in FIG. 7, is identical to the second except for having a delivery means depth only 6 inches below the glass line. A series of thermocouples are provided in each conditioner at the bottom, at the glass surface and at intermediate points along the centerline of the conditioner just upstream of the discharge means and also in the centerline of the canal in the conventional arrangement and in the centerline and near the outside walls or jambs of the delivery means employed in this invention.

All three units are operated under identical imposed conditions to make 500 tons of glass per day. The temperatures and longitudinal velocity components within the glass in each unit are shown in Tables 1 and 2 as well as in FIGS. 5, 6 and 7. The data described here was based on that obtained from small-scale simulation models accurately sized and operated to duplicate Reynolds numbers existing in the operation of full-size units. The data is reported in terms of full-size equivalents.

TABLE 1

FOWARD VELOCITY - INCHES/MINUTE

| Type of Glass Delivery | Flow Depth | Velocity Probe Positions to Right of Centerline Looking Toward Forming Bath | | | |
|---|---|---|---|---|---|
| | | 20 Inches | 60 Inches | 100 Inches | 140 Inches |
| Prior Art - Canal - 40 inches wide, 12 inches deep | Surface | 47 | 36.6 | 15.8 | 12.2 |
| | 5 inches deep | 55 | 30 | 15.8 | 15.8 |
| | 10 inches deep | 32 | 24.5 | 12 | 15.8 |
| | 15 inches deep | 27 | 19 | 9.2 | <0 |
| | 20 inches deep | 14 | 10.5 | 5.6 | <0 |
| | 25 inches deep | <0 | <0 | <0 | <0 |
| This Invention - Delivery - 180 inches wide, 12 inches deep | Surface | 8.4 | 8.2 | 5.8 | 2.4 |
| | 5 inches deep | 2.2 | 15 | 7 | 2.4 |
| | 10 inches deep | 17.4 | 13.2 | 7 | 1.8 |
| | 15 inches deep | 11 | 10.5 | 7 | 1.6 |
| | 20 inches deep | 6.2 | 5.6 | 4.8 | 1.1 |
| | 25 inches deep | <0 | <0 | <0 | |
| | | <0 | | | |
| This Invention - Delivery - 180 inches wide, 6 inches deep | Surface | 22 | 22 | 16 | 5.6 |
| | 5 inches deep | 18 | 18 | 15 | 4.1 |
| | 10 inches deep | 13.2 | 14 | 9 | 3 |
| | 15 inches deep | 6.5 | 6 | 5 | 3 |
| | 20 inches deep | 5 | r | | |
| | | 3 | <0 | | |
| | 25 inches deep | <0 | <0 | <0 | <0 |

TABLE 2

GLASS TEMPERATURES — ° F.

| Type of Glass Delivery | Refiner Centerline | | | | Delivery Means Bottom | | |
|---|---|---|---|---|---|---|---|
| | Bottom | ¼ | ¾ | Surface | left | Center | Right |
| Prior Art - As in Table 1 | 2075 | 2045 | 2165 | 2135 | — | 2015 | — |
| This Invention - 12-Inch Depth | 2060 | 2035 | 2165 | 2150 | 1985 | 2030 | 1985 |
| This Invention - 6-Inch Depth | 2060 | 2045 | 2165 | 2150 | 1985 | 2030 | 1985 |

The improved thermal inversion obtained in the conditioner when practicing this invention is evident from Table 2.

A comparison of velocities and temperatures in the three systems demonstrates that the present invention has velocity profiles across the lateral width of the conditioner which provide for a flatter and less warped neutral plane so as to enhance the lamellarity of flow within the exit region of the conditioner. It is also apparent from the velocities and temperatures that glass being delivered from the refiner or conditioner in the present method is more completely cooled without instability than is glass produced according to conventional methods. It is because of this feature that throughputs can be increased using the present method as opposed to the conventional method without requiring additional cooling equipment or a larger conditioner structure. The preferred process is that carried out with the shallow threshold or delivery means. In each process the neutral flow plane is at about the same distance from the bottom of the conditioner to the exposed glass surface at the centerline of forward flow. However, in the practice of the present invention as opposed to conventional practice, the positive flow integral above the neutral plane over the entire width of the conditioner is much more uniform than over the width of a conventional conditioner. This improved uniformity of velocity profile across the width of the conditioner is evidence of the improved lamellarity obtained in the glass flow approaching the delivery means in the present process.

EXAMPLE II

In an apparatus like that shown in FIGS. 1 and 2, molten glass having the composition described above is delivered onto a pool of molten tin at a rate of 450 tons/day. The temperature of the glass as it is delivered onto the tin is about 1950° F. across its entire width as indicated by conventional Radiamatic pyrometers positioned in the roof of the forming chamber and aimed at the glass. The side restraining members or guides are 10 feet apart and are not heated. They are thermally isolated from the outside walls of the chamber. The temperature of each of the guides near the discharge region is about 1900° F. near the end of each guide, which guides are about 6 feet in length; the temperature is about 1650° F. The guide temperatures are detected by platinum/platinum-10% rhodium thermocouples embedded in the alumina refractory guide material with the hot junction of thermocouples about 1 inch above and 2 inches laterally from the surface of the molten glass. Two roof coolers are positioned above the glass in the center of the region between the guides. These coolers each present a cooled face about 5 feet wide (across the width of the chamber) and about 2 feet long (along the direction of glass movement). The coolers are supplied with sufficient water at 75° F. that the water leaving the coolers is only about 78° F. Each cooler removes about 10,000 BTU/minute of heat from the chamber.

Three pyrometers in the roof of the chamber are ained at the glass along a line joining the downstream ends of the guides. One pyrometer is targeted along the centerline of glass movement, and the others are each targeted about 6 inches inward from the inside faces of the respective guides. The center temperature is about 1600° F; the two outside temperatures are each about 1650° F.

A dimensionally stable ribbon of glass is formed having a thickness of 0.210 inch and a width of 10 feet ± 1 inch. No edge rolls are employed to laterally stretch the glass.

The resulting ribbon of glass is substantially distortion-free over its central 112 inches; about 4 inches of glass along each edge has noticeably visible distortion; only the extreme marginal portions extending inward from the edges only about 2 inches have severe "herringbone" distortion.

The process of this invention produces a continuous ribbon of glass which has improved optical quality relative to that produced by conventional float glass manufacture. This striking degree of improvement which characterizes the glass made by this invention is evident when one looks through the glass in the normal fashion, that is with a line of sight which is generally perpendicular to (but in any event which intersects) the major plane of the glass. When the glass made by the present process is viewed toward a cut edge, which is formed by cutting the ribbon of glass across the width, it is apparent that the patterns within the glass are different in kind from those in a conventional ribbon of float glass viewed in the same manner.

Figure 8:
FIG. 8 is a scale representation of a typical cross-section of a sheet of glass produced by the prior art float forming process of Pilkington.
Figure 9:
FIG. 9 is a scale representation of a typical cross-section of a sheet of glass produced in accordance with this invention.

Referring now to FIGS. 8 and 9, the unique and novel character of glass formed in accordance with this invention will be evident. These drawings are scale representations of cross sections of the marginal portions of a glass ribbon of the prior art and of a glass ribbon according to this invention. The drawings are made from tracings of actual enlarged cross-sectional photographs, each made by immersing a sample of glass having a cut edge in a container of index of refraction matching fluid to eliminate cut surface refractions and reflections, backlighting the sample and photographing it through a wide angle lens. The major patterns are reproduced in the drawings with minor irregularities eliminated in both instances.

Prior art glass exhibits a characteristic "J" hook pattern near the bulb edge. This pattern, which breaks the continuity of the nested, layered pattern, consistently appears in glass produced by the Pilkington process. In contrast, glass made by this invention has a nested, layered pattern extending to the edges of the ribbon. While the glass of the prior art has a characteristic distortion line corresponding to the apparent surface emergent discontinuity in the pattern of the "J" hook, the glass of this invention does not have a continuous edge distortion line.

The present invention has been described here by specific illustrative examples. The scope of this invention is not intended to be limited by these specific examples, rather the scope of this invention is defined by the appended claim.

We claim:

1. A flat glass article made by supporting glass on molten metal while advancing it therealong and cooling it comprising a sheet of glass having two substantially parallel planar surfaces, spaced apart a distance designated as the thickness of said sheet, one surface having been in contact with molten metal while making said article, two formed edges and two cut edges, each intersecting both formed edges, said cut edges being characterized under sufficient magnification as comprising a series of nested, layered regions, each region substantially corresponding in shape to said formed edges as intersected by said cut edges, and said sheet of glass having substantially less optical distortion associated with it throughout its width between its formed edges than immediately adjacent its formed edges.

* * * * *

UNITED STATES PATENT AND TRADEMARK OFFICE
CERTIFICATE OF CORRECTION

PATENT NO. : 4,091,156

DATED : May 23, 1978

INVENTOR(S) : Charles K. Edge and Gerald E. Kunkle

It is certified that error appears in the above-identified patent and that said Letters Patent are hereby corrected as shown below:

Cover Sheet, 4th item listed, should be removed:

[*] Notice: The portion of the term of this patent subsequent to Oct. 22, 1991, has been disclaimed.

Signed and Sealed this

*Twenty-first* Day of *November 1978*

[SEAL]

Attest:

RUTH C. MASON
*Attesting Officer*

DONALD W. BANNER
*Commissioner of Patents and Trademarks*